US012719069B2

(12) United States Patent
Watton et al.

(10) Patent No.: US 12,719,069 B2
(45) Date of Patent: Aug. 25, 2026

(54) GAS DIFFUSION METHOD FOR USE WITH FUEL CELL STACK

(71) Applicant: Intelligent Energy Limited, Loughborough (GB)

(72) Inventors: James Watton, Leicestershire (GB); Simon Foster, Leicestershire (GB)

(73) Assignee: INTELLIGENT ENERGY LIMITED (GB)

( * ) Notice: Subject to any disclaimer, the term of this patent is extended or adjusted under 35 U.S.C. 154(b) by 519 days.

(21) Appl. No.: 18/266,239

(22) PCT Filed: Jan. 11, 2022

(86) PCT No.: PCT/EP2022/050457

§ 371 (c)(1),
(2) Date: Jun. 8, 2023

(87) PCT Pub. No.: WO2022/148886

PCT Pub. Date: Jul. 14, 2022

(65) Prior Publication Data

US 2024/0047722 A1 Feb. 8, 2024

Related U.S. Application Data

(60) Provisional application No. 63/136,067, filed on Jan. 11, 2021.

(30) Foreign Application Priority Data

Jan. 11, 2021 (GB) ..................................... 2100325

(51) Int. Cl.
*H01M 8/1004* (2016.01)
*H01M 8/0273* (2016.01)

(52) U.S. Cl.
CPC ....... *H01M 8/1004* (2013.01); *H01M 8/0273* (2013.01)

(58) Field of Classification Search
CPC ............ H01M 8/0234; H01M 8/0276; H01M 8/0273; H01M 8/1004; H01M 8/2483; H01M 2008/1095; Y02E 60/50
See application file for complete search history.

(56) References Cited

U.S. PATENT DOCUMENTS 8,323,846 B2 12/2012 Benson
2007/0166596 A1 7/2007 Benson
(Continued)

FOREIGN PATENT DOCUMENTS

CN 104241671 A 12/2014
JP H08-031434 A 2/1996
(Continued)

OTHER PUBLICATIONS

International Patent Application No. PCT/EP2022/050457; Int'l Written Opinion and Search Report; dated May 6, 2022; 11 pages.

*Primary Examiner* — Daniel S Gatewood
(74) *Attorney, Agent, or Firm* — BAKER HOSTETLER, LLP

(57) ABSTRACT

Aspects of managing fluid diffusion across active regions of one or more of a cathode and anode are disclosed herein, aspects include a method of efficient fluid distribution within an MEA (20) by forming a fluid confinement space with a sealing gasket (50) forming placed on at least one of an anode and a cathode of a fuel cell the gasket configured with at least one inlet (140) fluidly communicating with the fluid containment space and at least one outlet (145) through the gasket (50) fluidly communicating with the fluid containment space, inserting a generally planar rectangular porous gas diffusion layer (40) with two end walls, and two side walls, configured to fit form at least one inlet plenum (186)
(Continued)

is formed around at least one edge of the gas diffusion layer (40) and an annular wall of the fluid confinement space and one outlet plenum (188) and, the resistance to fluid flow along the inlet plenum (186) is balanced against the resistance to fluid flow across the gas diffusion insert configured to urge fluid transport generally evenly across the width of the insert to the outlet plenum (188) configured to fluidly connect to the outlet (145).

5 Claims, 5 Drawing Sheets

(56) References Cited

U.S. PATENT DOCUMENTS

| | | | | |
|---|---|---|---|---|
| 2009/0029231 | A1* | 1/2009 | Hood | H01M 8/0263 277/312 |
| 2012/0141921 | A1* | 6/2012 | Han | H01M 8/0297 429/535 |
| 2018/0269498 | A1 | 9/2018 | Wilson | |

FOREIGN PATENT DOCUMENTS

| | | | |
|---|---|---|---|
| JP | 2007-533071 | A | 11/2007 |
| JP | 2009-525439 | A | 7/2009 |
| JP | 2018-534728 | A | 11/2018 |
| WO | WO 2020/121830 | A1 | 6/2020 |

* cited by examiner 10
50
GDL
20
22
24
23
21
GDL
50'

30
60
"inlet"
"outlet"
50
40
70
20
40
75
50'
60

120
130
100
130
120
30
125
135
"A"

150A
150B
150N
150C
150D
135

125

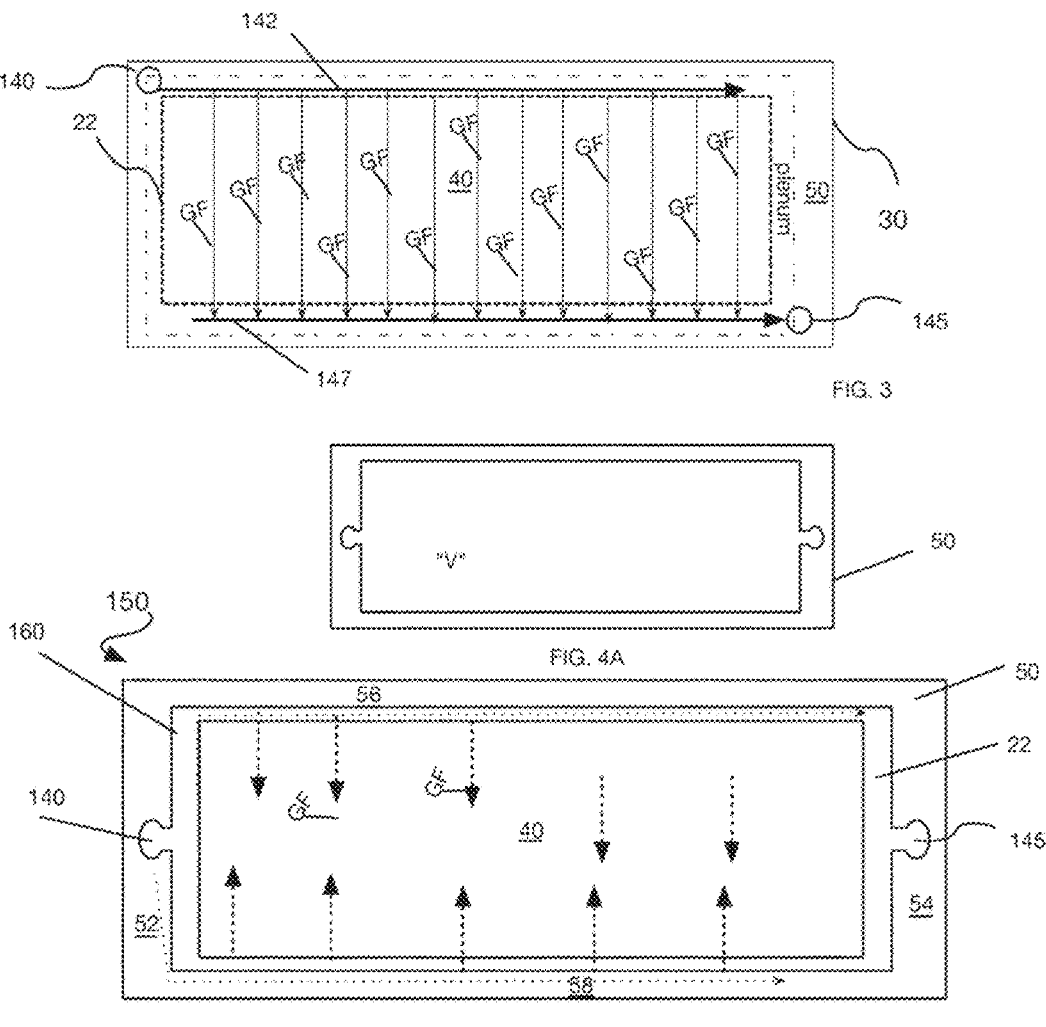
FIG. 3
FIG. 4A
FIG. 4B
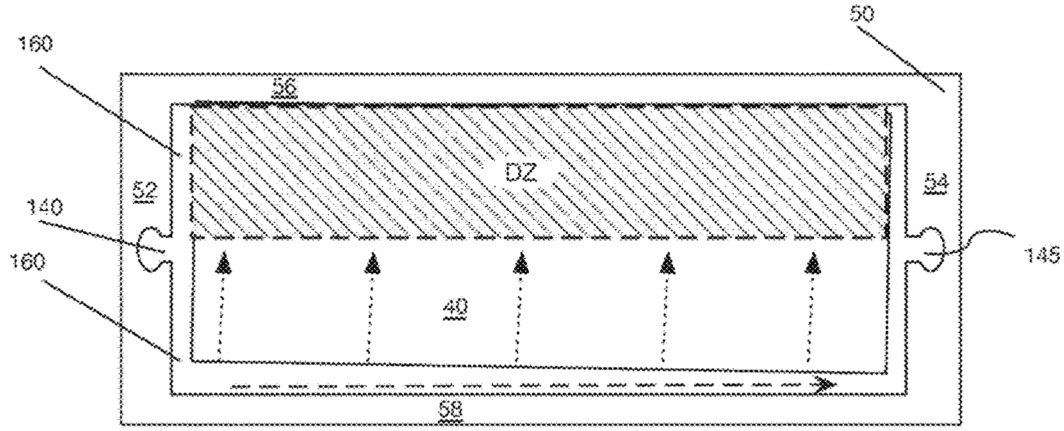
FIG. 4C

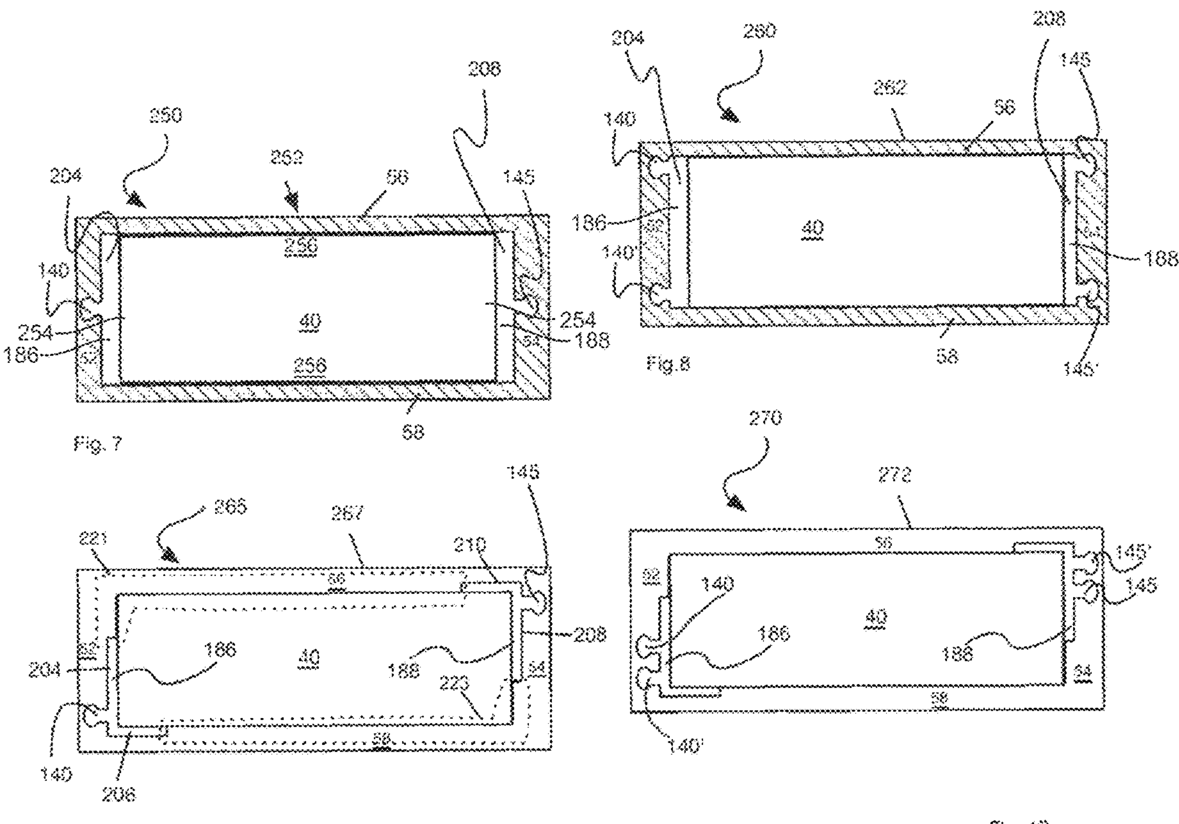
Fig. 7
Fig. 8
Fig. 9
Fig. 10
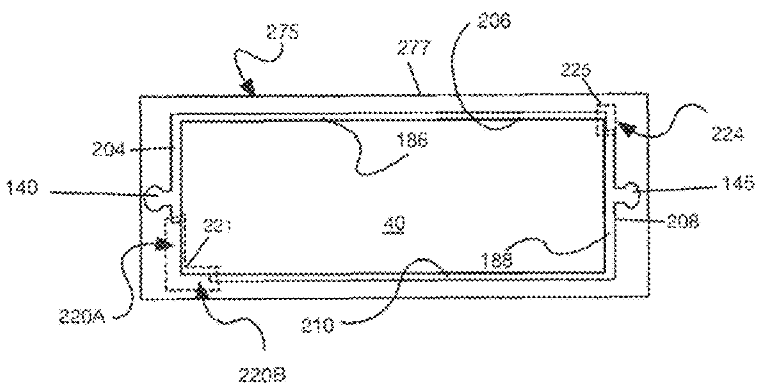
Fig. 11

280
206
282
140
186
40
210
188
145

285
287
223
140
186
204
206
40
208
188
145
221
210

290
56
206B
295
292
210B
208
186
188
204
40
140
145
204
206A
295
210A
58

GAS DIFFUSION METHOD FOR USE WITH FUEL CELL STACK

CROSS REFERENCE TO RELATED APPLICATIONS

This application is the National Stage Application of International Patent Application No. PCT/EP2022/050457, filed Jan. 11, 2022, which claims the benefit of priority to GB Application No. 2100325.6, filed Jan. 11, 2021; and U.S. Provisional Application No. 63/136,067, filed Jan. 11, 2021, the entire contents of both of which are incorporated herein by reference.

TECHNICAL FIELD

This disclosure generally relates to gas diffusion for use with fuel cells and fuel cell stacks.

BACKGROUND

A fuel cell is a device that generates electricity by a chemical reaction. Every fuel cell has two electrodes called, respectively, the anode and cathode. The reactions that produce electricity take place at the electrodes.

Fuel cells have greatest utility when arranged in fuel cell stacks adjacent each other wherein the share manifolds and fluid fuel feeds in and out.

FIG. 1 illustrates main components of a traditional fuel cells 10. Components include the MEA "membrane electrode assembly" 20 which is configured to have an anode side 22 and a cathode side 24 and a gas diffusion layer "GDL" facing each of the cathode and anode respectively. A frame or reinformed edge 23 may be provided to improve structural integrity during assembly. A fuel cell generates electricity by transporting electrons. On the anode side catalysts facilitate the splitting of electrons from Hydrogen thereby forming protons and electrons. The protons travel through the MEA and form water with oxygen in the cathode side and the electrons flow around the MEA generating electricity. Efficiency of the fuel cell is directly correlated to two processes. First the GDL is configured to evenly and diffusely spread fluid across the anodes and cathodes to catalyse the reaction across as much of the MEA surfaces as possible. Second water needs to be balanced between water retention (needed to maintain membrane conductivity) and water release to keep the pores of the MEA open so hydrogen and oxygen can diffuse into the electrodes.

In fuel cell stacks, if one or more of the cells in the stack perform outside a nominal range, the efficiency of the stack varies. If performance variations result in excessive use of fuel, that use results in reduced efficiency. If individual cells diffuse gaseous fluid fuel differently and that difference is more than a nominal variation, then the active area of the cell is reduced due to dead zones which causes reduced efficiency.

Forming fuel cell stacks from individual fuel cells is a tedious process, automation can improve the efficiency however, very lightweight components are easily dislodged during assembly resulting in variations or misplacement all of which contribute to the above inefficiencies or even leaking of the fuel cell components. Therefore, it is a desideratum to eliminate such variations and misplacements to improve efficiency of the fuel cell stack.

SUMMARY

Disclosed herein are aspects of exemplary implementation which provide for improved efficiency and reduce movement of a gas diffusion insert in each fuel cell, thereby reducing variations in assembly and variations in fluidflow.

Each fuel cell is enclosed by a pair of separator plates. These separator plates engage with the sealing gaskets to enclose the cell and may provide compression to the cell's components such as the GDL. In some cases, these separator plates are monopolar, meaning that a given plate only engages with one fuel cell and therefor the number of separator plates required is 2 per cell. In other implementations bipolar separator plates can be used. In this case a separator plate is shared between two adjacent cells, contacting the anode side of a first cell and the cathode side of an adjacent cell. In an arrangement using bipolar plates n+1 separator plates are required for an arrangement of n fuel cells. The skilled person will appreciate that the described invention applies to both monopolar and bipolar architectures.

Disclosed herein are aspects of exemplary implementation which provide for improve efficiency and reduce movement of a gas diffusion insert by forming inlet and outlet plenums around a gas diffusion insert or layer which efficiently direct fluid flow through a larger portion of the diffusion insert resulting in at least hydrogen fuel flowing over a greater portion of the anode adjacent thereto.

Disclosed herein are aspects of exemplary implementation which provide for improve efficiency and reduce movement of a gas diffusion insert by forming inlet and outlet plenums around a gas diffusion insert or layer including a membrane electrode assembly (MEA) having efficient fluid distribution configured with an ion transfer membrane and at least one of an anode and cathode which is in fluid communication with a gas diffusion assembly having a sealing gasket forming a fluid containment space, a first interface, at least one inlet through the gasket fluidly communicating with the fluid containment space, at least one outlet through the gasket fluidly communicating with the fluid containment space, a generally planar rectangular porous gas diffusion insert (40) with two end walls, and two side walls, configured to fit within the fluid containment space and. whereby the first interface is sealable against the ion transfer membrane and at least one inlet plenum is formed around at least one edge of the gas diffusion insert and an annular wall of the cavity. The resistance to fluid flow along the inlet plenum is balanced against the resistance to fluid flow across the gas diffusion insert configured to urge fluid transport generally evenly across the width of the insert to an outlet plenum configured to fluidly connect to the outlet.

In some instances, the MEA further comprising at least one outlet plenum formed around at least one edge of the gas diffusion insert and an annular wall of the fluid containment space.

In some instances, the gasket forms rectangular fluid containment space. In some instances, the MEA further the inlet plenum is between an end of GDL and the inlet end of the gasket. In some instances, the outlet plenum is between an end of GDL and the outlet end of the gasket.

In some instances, the fluid containment space is generally rectangular and configured with an inlet catch extending into the fluid containment space and partially sealing the GDL against the sealing gasket. In some instances, the fluid containment space is generally rectangular and configured with an outlet catch extending into the fluid containment space and partially sealing the GDL against the sealing gasket.

Disclosed herein are aspects of exemplary implementation which provide for improve efficiency and reduce movement of a gas diffusion insert by forming inlet and outlet plenums around a gas diffusion insert or layer including a membrane electrode assembly (MEA) having efficient fluid distribution configured with an ion transfer membrane and at least one of an anode and cathode which is in fluid communication with a gas diffusion assembly having a sealing gasket forming a fluid containment space, a first interface, at least one inlet through the gasket fluidly communicating with the fluid containment space, at least one outlet through the gasket fluidly communicating with the fluid containment space, a generally planar rectangular porous gas diffusion insert (40) with two end walls, and two side walls, configured to fit within the fluid containment space and. whereby the first interface is sealable against the ion transfer membrane and at least one inlet plenum is formed around at least one edge of the gas diffusion insert and an annular wall of the cavity. The resistance to fluid flow along the inlet plenum is balanced against the resistance to fluid flow across the gas diffusion insert configured to urge fluid transport generally evenly across the width of the insert to an outlet plenum configured to fluidly connect to the outlet.

In some instances, an inlet end wall gallery and a lateral inlet wall gallery are fluidly connected forming the inlet plenum. In some instances, an outlet end wall gallery and a lateral outlet wall gallery are fluidly connected forming the outlet plenum. In some instances, the inlet catch, and the outlet catch cooperate to consistently position the GDL from cell to cell in a fuel cell stack.

In some instances in the above exemplars the ratio of end wall inlet gallery to rectangular GDL end wall is between about 1:1-about 1:5, about 1:1-about 1:4.5, about 1:1-about 1:4, about 1:1-about 1:3.5, about 1:1-about 1:3, about 1:1-about 1:2.5, about 1:1-about 1:2, about 1:1-about 1:1.5, and about 1:1-about 1:0.

In some instances in the above exemplars the ratio of end wall outlet gallery to rectangular GDL end wall is between about 1:1-about 1:5, about 1:1-about 1:4.5, about 1:1-about 1:4, about 1:1-about 1:3.5, about 1:1-about 1:3, about 1:1-about 1:2.5, about 1:1-about 1:2, about 1:1-about 1:1.5, and about 1:1-about 1:0.

In some instances in the above exemplars the ratio of the lateral wall inlet gallery to rectangular GDL side wall (256) is between about 1:1-about 1:5, about 1:1-about 1:4.5, about 1:1-about 1:4, about 1:1-about 1:3.5, about 1:1-about 1:3, about 1:1-about 1:2.5, about 1:1-about 1:2, about 1:1-about 1:1.5, and about 1:1-about 1:0.

In some instances in the above exemplars the ratio of lateral outlet wall gallery to rectangular GDL side wall (256) ratio is between about 1:1-about 1:5, about 1:1-about 1:4.5, about 1:1-about 1:4, about 1:1-about 1:3.5, about 1:1-about 1:3, about 1:1-about 1:2.5, about 1:1-about 1:2, about 1:1-about 1:1.5, and about 1:1-about 1:0.

Disclosed herein are aspects of methods of efficient fluid distribution within an MEA including. forming a fluid confinement space with a sealing gasket forming placed on at least one of an anode and a cathode of a fuel cell the gasket configured with at least one inlet fluidly communicating with the fluid containment space and at least one outlet through the gasket fluidly communicating with the fluid containment space; inserting a generally planar rectangular porous gas diffusion layer with two end walls, and two side walls, configured to fit form at least one inlet plenum is formed around at least one edge of the gas diffusion layer and an annular wall of the fluid confinement space and one outlet plenum; and, wherein the resistance to fluid flow along the inlet plenum is balanced against the resistance to fluid flow across the gas diffusion insert configured to urge fluid transport generally evenly across the width of the insert to the outlet plenum configured to fluidly connect to the outlet.

BRIEF DESCRIPTION OF THE DRAWINGS

The present application is further understood when read in conjunction with the appended drawings. For the purpose of illustrating the subject matter, there are shown in the drawings, exemplary aspects of the subject matter; however, the presently disclosed figures are not necessarily to scale, emphasis instead being placed upon illustrating the principles of the invention. In the figures, like reference numerals designate corresponding parts throughout the different views.

FIG. 3 shows a top view of the anode side of a fuel cell illustrating fluid flow according to an aspect of the disclosure;

FIG. 4A shows a top view of the volume formed by a gasket

FIG. 4B shows a view of a partially exploded top view of the anode side of a fuel cell according to an aspect of the disclosure;

FIG. 4C shows atop view of a partially exploded top view of the illustration in FIG. 4A when the GDL shifts;

FIGS. 7 and 8 show aspects of exemplars of rectangular GDLs in rectangular sealing gaskets; and, FIGS. 9 and 14 show aspects of exemplars of rectangular GDLs in shaped sealing gaskets.

Additional aspects of the exemplars of the disclosure will now be described in detail with reference to the drawings, wherein like reference numbers refer to like elements throughout, unless specified otherwise.

FURTHER DISCLOSURE

Figures 1, 2A, 2B, 2C:
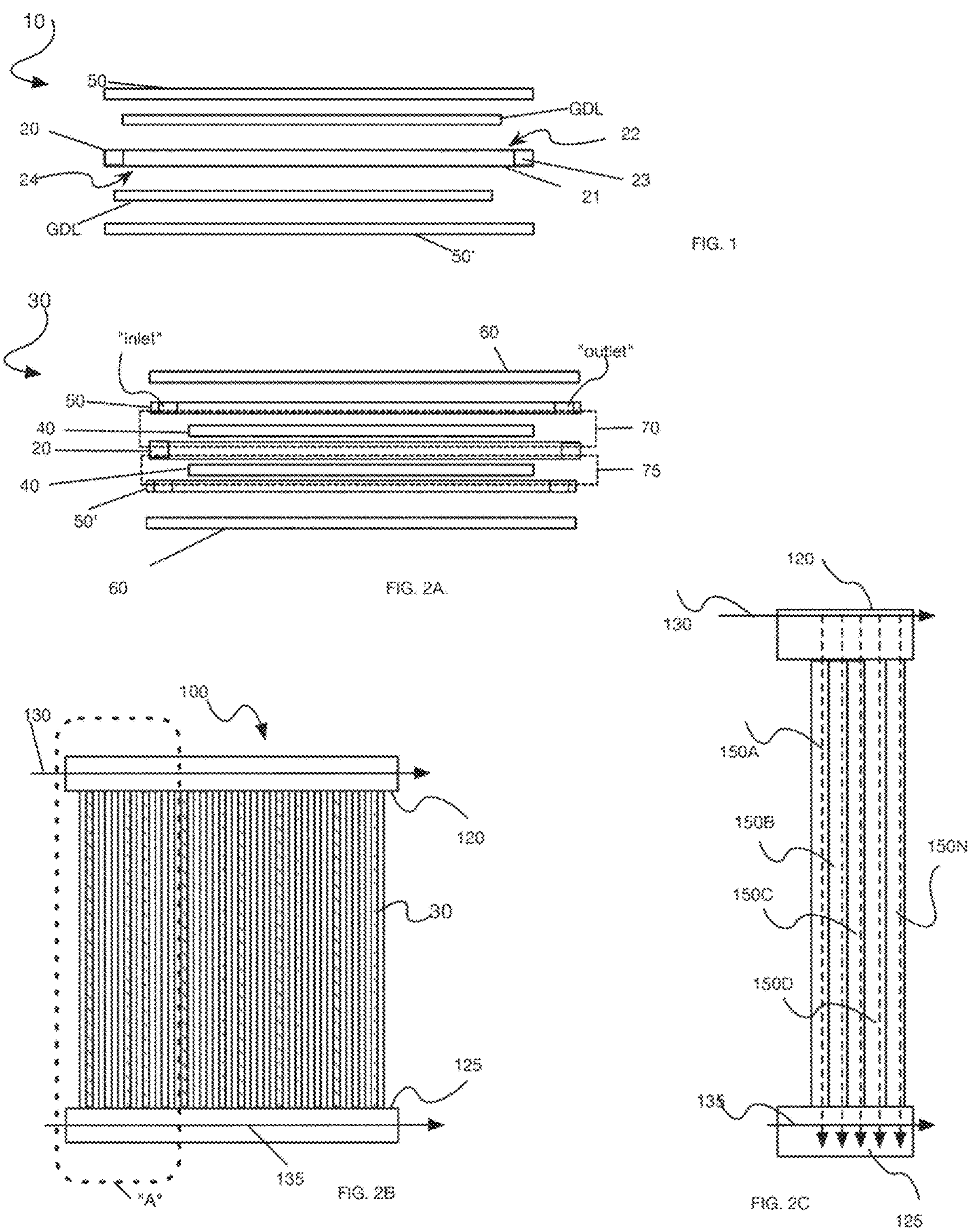
FIG. 1 shows a side cutaway assembly view of main components of a typical monopolar fuel cell.
FIG. 2A shows a side cutaway assembly view of a fuel cell according to an aspect of the disclosure.
FIG. 2B shows a fuel cell stack according to an aspect of the disclosure.
FIG. 2C shows a magnified view of a portion of FIG. 2B.

Fuel cells are multilayer sandwich (see generally FIGS. 1 and 2A). FIGS. 2A through 2C show a MEA 20 configured with anode and cathode and each of the anode 22 and cathode 24 is configured to receive a GDL 40 and sealing gasket. A first sealing gasket 50 has a fluid inlet and a second sealing gasket 50' has a fluid outlet. The inlets and outlet are configured to provide fluid in a controlled fashion in response to controller (not shown) operation of a fuel cell and fuel cell stack. The sandwich for one cell is completed with a conductive separator plate 60 on each side these are also known as fluid flow field plates, and are formed of an electrically conductive, fluid-impermeable material by which electrical contact can be made to. Once the sandwich is formed, a fluid containment space or volume "V" is constructed on each of the anode and cathode sides of the MEA which is configured to retain the GDL.

A first interface 70 is formed between the anode 22, GDL 40, and the first sealing gasket 50. A second interface 75 is formed between the cathode 24, GDL 40, the second sealing gasket 50.

The GDL 40 is a porous diffuser material configured to assists transfer from the MEA anode and cathode surface (which in some instances may have grooves or channels therein on at least one side) to support cross-MEA diffusion as well as in-plane diffusion (i.e. parallel to the plane of the GDL(40)) to provide good transport of anode fluid access, entire active anode surface of the MEA, and good transport of cathode fluid across the cathode surface of the MEA. A rectangular GDL is the most efficient and cost-effective use of the expensive GDL material. Any cut-outs or extended tabs result in expensive waste products (See generally U.S. Pat. No. 8,323,846 issued to Benson).

When a plurality of fuel cell 30 are placed into a fuel cell stack 100 a common fuel feed manifold 120 is formed and a common outlet manifold 125 is formed wherein fluid 130 feeds into the inlets of each fuel cell via the fuel feed manifold 120 and the exhaust consisting of unspent fuel, produced water, nitrogen or other contaminants 135 are removed through the common outlet manifold 125. FIG. 2C illustrates a magnified partial view of several fuel cells in the stack and the fuel feed manifold and outlet manifold. The fuel fluid is shown transported 150A through 150N into each fuel cell stack. Removal of Exhaust is shown via outlet manifold 135.

Efficient fluid flow through the GDL and over the active anode is shown in FIG. 3. This figure illustrates aspect of operation and is not intended to be a structural device exemplar. A fluid inlet 140 for an anode gasket 50 and a fluid outlet 145 each communicate with a plenum which is essential a gap formed around the GDL 40 whereby fluid flowing into the fuel cell 142 migrates as gas flow "GF" over the anode surface and is exhausted 147 through the fluid outlet.

FIG. 4A shows the volume "V" formed by a gasket. FIGS. 4A and 4B show a top view of the anode side of a fuel cell 150 (the conductive plate is removed to simplify the illustration). FIG. 4A shows an ideal state wherein a rectangular GDL is positioned perfectly within a rectangular containment formed by a gasket. However, what is theoretically possible is not necessarily practical. FIG. 4C illustrates the debilitating impact on fuel cells and the ensuing impact on efficiency in a fuel cell stack of poorly operating fuel cells.

Complete and even immersion of the anode with hydrogen via the GDL is the operational goal. If the GDL 40 is placed in the center of the plenum 160 formed between the gasket 50 and GDL efficiency should be very high. FIGS. 4A and 4B shows the fluid inlet 140 centered in the inlet end 52 of the gasket and the outlet centered in the outlet end 54 of the gasket. If the GDL 40 is maintained equidistant from the first and second lateral walls 56 and 58 the pressure resistance to fluid flow around the plenum is equal down each lateral wall 56/58 and is such that the lateral flow along the plenum is balanced against the resistance to fluid flow of the GDL. The GDL should be less resistant to flow then the path along the plenum whereby diffusion over the active anode 22 surface is maximized thus avoiding dead zones "DZ" and supporting high efficiency of operation. However, as shown in FIG. 4B if the GDL is not set and held in a predetermined position from the walls, a portion of the plenum is constricted and will no longer supply fluid evenly, nor is the fluid diffusing into the GDL evenly thus resulting in one or more dead zones "DZ", which are areas wherein the resistance to flow down the plenum (or gallery) is less than the resistance to flow into the GDL, thereby causing fluid to pass around and not into the GDL. We have observed that during assembly a not insignificant portion of fuel cells in stack will have one or more GDLs which have rotated and thus the efficiency of that cell is diminished. Moreover, the inefficient fuel cell in the stack not only produces less electricity but requires more hydrogen to purge. This "weakest link" causes loss of fuel which is wasted to purge. Fuel losses result in lost energy efficiency. Configurations which utilize complex GDL configurations with cutout or tabs to position the GDL in the plenum drive costs of product up and cause waste.

Figures 5, 6:
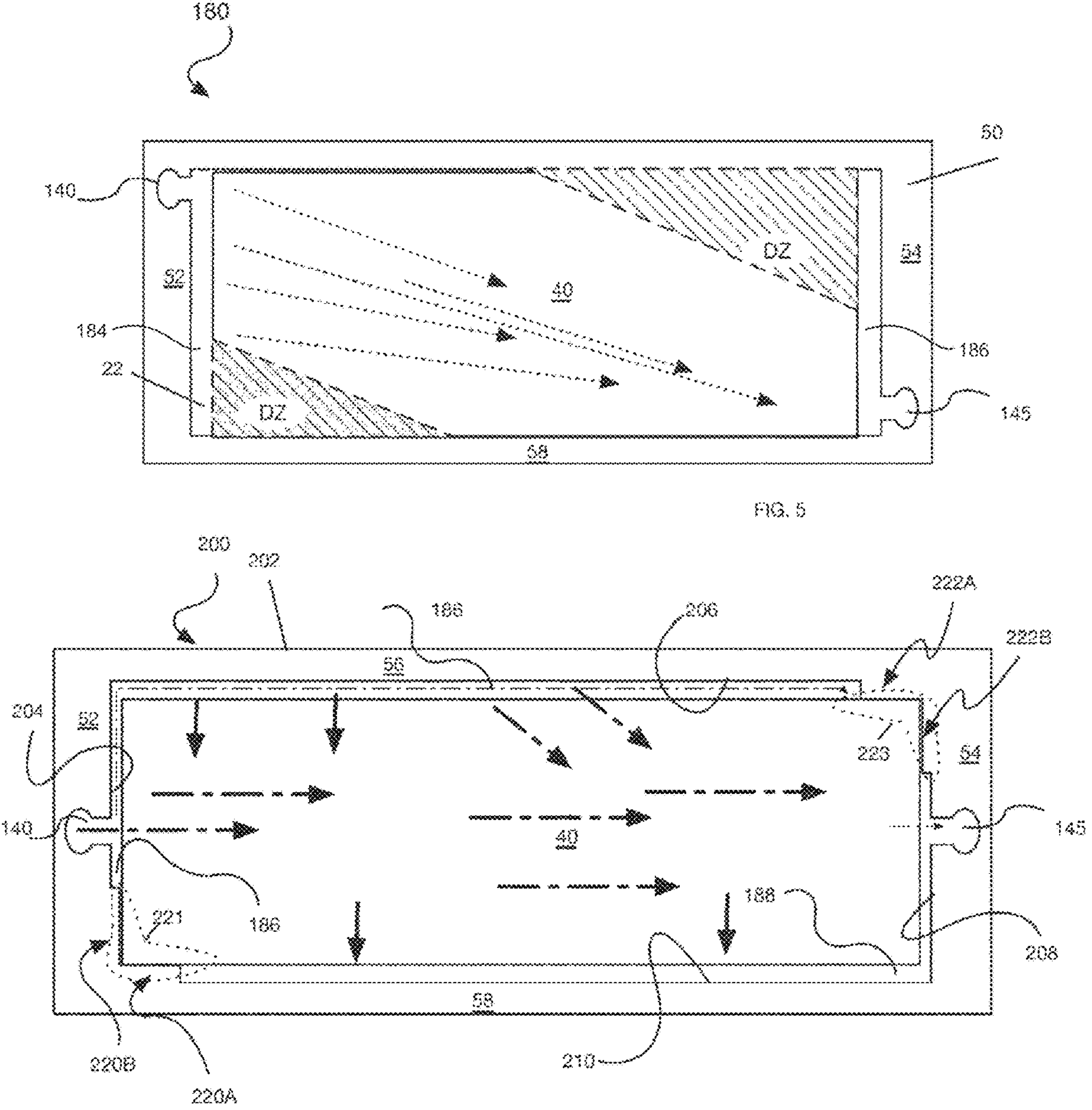
FIG. 5 shows a top view of the anode side of a fuel cell illustrating fluid flow according to an aspect of the disclosure.
FIG. 6 shows aspects of an exemplar having a shaped gasket and rectangular GDL according to the disclosure.

FIG. 5 illustrates a rectangular GDL which minimizes or eliminates positioning variations as described in reference to FIG. 4B. In this embodiment the rectangular GDL 40 is fitted tightly against the lateral walls each lateral wall 56/58 forming a partially sealed region between the lateral walls of the GDL and the gasket. A close fit or interference fit between the edges is sufficient. Some compression of the GDL material during stack assembly may assist in formation of this partial seal.

Typically, for a planar fuel cell, the MEA 40 is manufactured as a thin polymer layer sandwiched between electrode layers on either side, respectively forming the anode face and the cathode face. The faces of the MEA preferably comprise a central active area surrounded by a peripheral area (or frame (23)) which is reinforced to allow the formation of entry and exit ports and other manifolds with reduced risk of damage to the structural integrity of the MEA. In this reinforced peripheral area, the MEA is less susceptible to damage from various strains, and forces more effectively than the thin active area of the electrode. Where such a reinforced MEA is used, it is preferable that the plenums are located overlying the reinforced peripheral area of the MEA to help avoid any risk that structural failure could occur in the MEA due to lack of support to the central active area of the MEA when the fuel cell is compressed during assembly.

The positioning need not be equidistant from the outlet and inlet end walls 52/54. By placing the inlet 140 and outlet 145 at diagonal corners the fluid flows over a larger area of the GDL. An inlet plenum 186 is formed fluidly connected to the inlet 140. An outlet plenum 188 is formed fluidly connected to the outlet 145. However, while this arrangement solves variability problems that cause uneven operation of fuel cells within a stack it does result in dead zones "DZ" in each cell which in turn reduce efficiency as discussed previously. While the embodiment described in reference to FIG. 5 improves the ability to repeatedly place the GDL, it suffers from some of its own losses. FIG. 6 illustrates a compromise between the dead zones caused by the FIG. 5 embodiment and the rotational defect resultant from the FIGS. 4A and 4B embodiments.

In FIG. 6 an inlet gallery or plenum is formed as well as an outlet plenum or gallery. The GDL 40 diffuser should diffuse evenly beneath and in plane. In some instances, the GDL is formed to have axially-dependent permeability. Thus, the fluid transport rate in one in-plane direction may be different than gas transport rate in another in-plane direction. In this case, the diffuser sheets may be advantageously oriented such that the most effective and homogeneous gas transport between the plenums or from the inlet 140 to the central region of the GDL sheet is effected. In some instances, GDL materials may have an orientation of fibres (e.g. a woven mat) which provides this axial dependency, and the fibres can preferably be oriented in an across-the-cell direction to assist with hydrogen transport to the center of the GDL. To support optimal diffusion rate across the GDL material, it should not be significantly crushed or compressed during assembly of the fuel cell, i.e. when all the stack plates are compressed together to form the fuel cell assembly. Preferably, the sealing gasket material 50 is selected to be harder (less compressible) than the GDL material. A non-exclusive exemplar material is gas diffusion media TGP-H grades of carbon fibre paper manufactured by Toray. In some instances, the gasket has a thickness, lying in the range of 100 to 400 microns, and the GDL has a thickness in the range of 150 to 500 microns. In some instances, the sealing gasket has a thickness of 225 microns, and the GDL sheet has a thickness of 300 microns, and is configured to compress at least 75 microns, to both seal the cell upon assembly and hold the GDL in place without significant compression. In some instances, significant compression is compression no greater than 5%. In some instances, significant compression is compression no greater than 10%. In some instances, significant compression is compression no greater than 15%. In some instances, significant compression is compression no greater than 20%. In some instances, significant compression refers to the resistance to the pressurized fluid flow which increases the GDL resistance to pressure flow such that more than a threshold percentage of dead zone results from said compression. In some instances that threshold is greater than 2%. In some instances that threshold is greater than 3%. In some instances that threshold is greater than 4%. In some instances that threshold is greater than 5%. In some instances that threshold is greater than 6%. In some instances that threshold is greater than 7%. In some instances that threshold is greater than 8%. In some instances that threshold is greater than 9%. In some instances that threshold is greater than 10%.

Although the GDL is a porous material configured to provide for fluid flow and diffusion therein it provides sufficient structure to form a separator between itself and the inner annular walls of the gasket. FIG. 6 illustrates a fuel cell 200 with a shaped sealing gasket 202 that cooperates with the rectangular GDL 40 to minimize the dead zones and/or position the rectangular GDL. For purposes of disclosure, the sealing gasket has an uninterrupted annular wall which is configured to form the volume "V".

The shaped sealing gasket 202 is formed with two inlet step walls 220A and 220B. These step walls are positioned at 90 degrees apart in plane and displace a portion of the volume "V" to form an inlet catch 221. At an opposite corner of the gasket two outlet step walls 222A and 222B are formed. These step walls are positioned at about 90 degrees apart in plane and displace a portion of the volume "V" to form an outlet catch 223. The catches formed in the gasket position the lateral wall "LW" of the GDL fitted tightly against lateral walls of the gasket's catch forming a partially sealed region without being significantly crushed, consistently and predictably; said positioning is configured to form substantially the same dimension inlet and outlet plenums on multiple fuel cell which use the same dimension gasket and same GDL formed of the same materials. Any variations in the plenums from fuel cell to fuel cell will be limited to variations in the distortion of the gasket and/or GDL when the components are sandwiched together. Our experience and testing have shown that such variations are negligible and do not adversely affect the consistent predetermined fluid flow through the plenums or diffusion through the GDL.

Although FIG. 6 illustrates a length of inlet gallery and a length of outlet gallery compared to the length or width of the GDL, that figure is not intended to be limiting with respect to the gallery ratio(s) to the GDL. FIGS. 7-14 illustrate some additional implementations we have experimented with. It would be overly burdensome to provide illustrations on every percentage ratio difference. Accordingly, these figures do not set limit but rather represent a spectrum of ratios of inlet and outlet gallery to GDL length or width. The choice of which may depend on the material the GDL is constructed of, the gallery width and/or shape or the operating conditions of the fuel cell. What a skilled artisan (person of ordinary skill in the art) will understand is that the scope of this disclosure is of the balance between the resistance to pressure down the gallery and the resistance to pressure across the GDL utilized to limit dead zones and in some instances limit dead zones in the active region(s) and thus have consistent high efficiency of operation. With respect the FIGS. 6-14 those efficiencies are provided with the assembly simplicity and cost benefits of a rectangular GDL, which eliminates the waste produced by using a shaped GDL.

FIGS. 7 and 8 illustrate a rectangular GDL in sealing gasket. FIG. 8 provides multiple inlets and outlets. The exemplary gasket/GDL combination 250 shown in FIG. 7 has a sealing gasket 252 which is rectangular with no shaped inner annular walls to catch the rectangular GDL configured with two end walls 254 and two side walls 256. The rectangular the inlet end wall gallery 204 corresponds to the inlet plenum 186 which is formed fluidly connected to the inlet 140 but does not extend to a lateral inlet wall. In this exemplary the outlet end wall gallery 208 corresponds to the outlet plenum 188 which is formed fluidly connected to the outlet 145 but does not extend to a lateral outlet wall.

The exemplary gasket/GDL combination 260 shown in FIG. 8 has a sealing gasket 262 which is also rectangular with no shaped catches and the inlet end wall gallery 204 corresponds to the inlet plenum 186, which is fluidly connected to multiple inlets 140 and 140' but does not extend to a lateral inlet wall. In this exemplary the outlet end wall gallery 208 corresponds to the outlet plenum 188 which is fluidly connected to multiple outlets 145 and 145' but does not extend to a lateral outlet wall. Adding multiple inlets and outlets provides one of reducing the steepness of the gradient or form multiple partial pressure gradients working together to urge the fluid to diffuse evenly through the GDL.

FIGS. 9 and 10 illustrate inlet and outlet plenums which have a shorter lateral inlet wall gallery 206 and a shorter outlet lateral wall gallery 210 then that shown in FIG. 6. The illustration shown in FIGS. 9 and 10 have the improved positioning stability. The exemplary gasket/GDL forming plenums 265 shown in FIG. 9 provides a shaped sealing gasket 267 with step walls positioned at 90 degrees apart in plane and the displace a portion of the volume "V" to form an inlet catch 221. At an opposite corner of the shaped sealing provides an outlet catch 223. The catches function as describer in reference to FIG. 6 exemplar. FIG. 10 differs from FIG. 9 in that it provides multiple inlets 140 and 140' and multiple outlets 145 and 145'.

The exemplary gasket/GDL combination 275, shown in FIG. 11, has a sealing gasket 277, which is shaped with an inlet catch 221 formed by step walls 220A and 220B, which catches and positions a corner of the GDL 40. At the diagonal corner of the shaped sealing gasket 275 a protrusion 224 from a portion of one of the outlet end wall gallery 208 forms a straight outlet barrier 225, which effectively seals against the GDL 40 and cooperates with the inlet catch to the position in one of the x and y axis.

Figures 12, 13, 14:
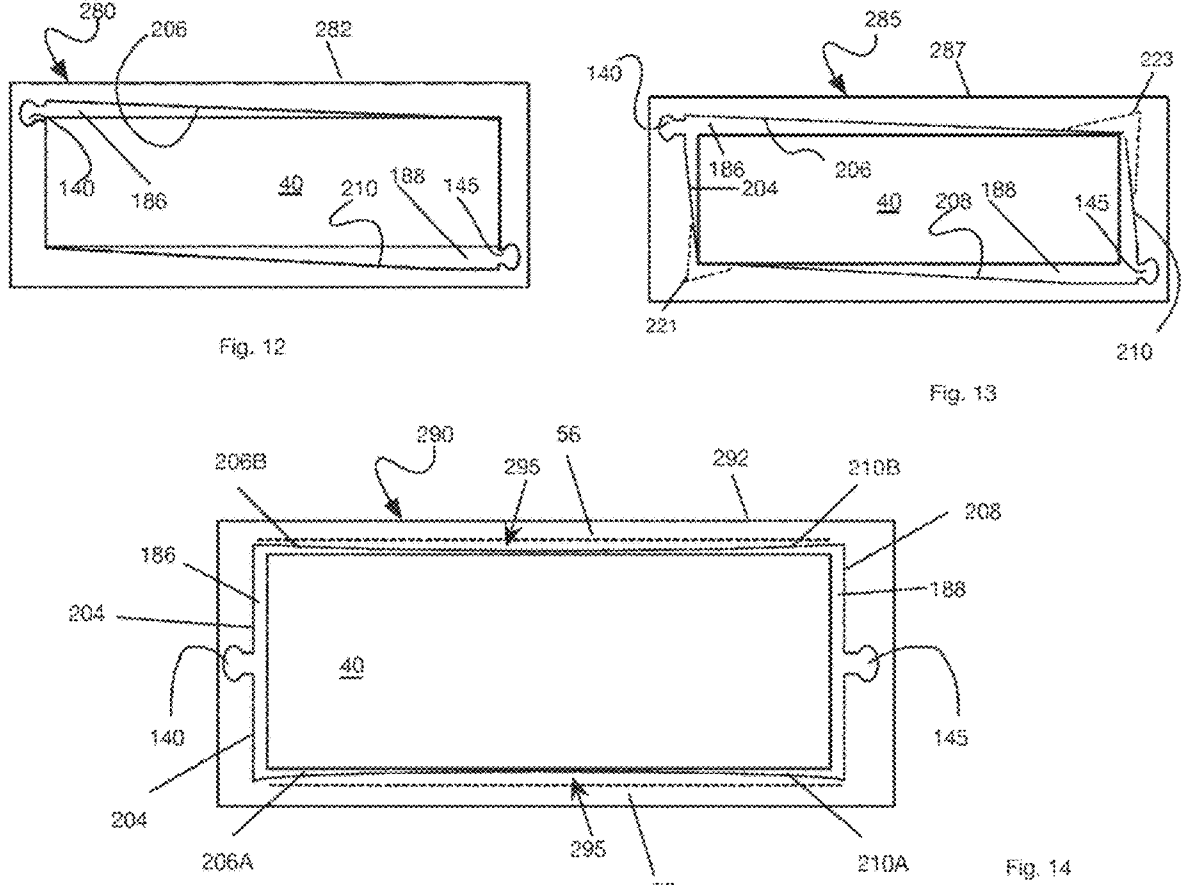

FIGS. 12 and 13 disclose tapered inlet and outlet plenums. The exemplar gasket/GDL combination 280 shown in FIG. 12 has a sealing gasket 282 which is shaped with angled or tapered inlet lateral wall gallery 206 and outlet lateral wall gallery 210. In this exemplary there is no inlet end wall gallery 204 nor is there an outlet end wall gallery 206.

Rather, the inlet 140 is fluidly connected to the inlet lateral wall gallery 206 and the outlet is fluidly connected to the outlet lateral wall gallery 208. The rectangular GDL is positive held at each end in this configuration.

The exemplary gasket/GDL combination 285 shown in FIG. 13 has a sealing gasket 287 which forms plenums with angled or tapered inlet end wall gallery 204, lateral wall gallery 206, outlet end wall 208 and outlet lateral wall gallery 210. In this exemplar the inlet feeds into both the end wall and lateral wall galleries, an inlet catch 221 is formed to seal against a first corner of the rectangular GDL. An outlet catch 223 is formed to seal against a second corner of the rectangular GDL oriented diagonally from the first corner. In this exemplar the dead zones can be minimized. However, the potential for movement of the rectangular GDL during assembly (and the impact of same on efficiency and consistency between fuel cells in a stack) is higher than that of the exemplary described in reference to FIGS. 6-12. However, under the appropriate circumstances and assembly controls this exemplary may have smaller dead zones in the active area.

The exemplary gasket/GDL combination 290 shown in FIG. 14 has a sealing gasket 292 forming inlet and outlet plenums. The inlet 140 is fluidly connected to the inlet plenum 186, which is a fluidly connected region that spans from inlet end wall gallery 204 to two angled lateral wall galleries 206B and 206A. The lateral wall galleries are sealed via an extended gasket region 295 which is generally an extended portion of the first and second lateral walls 56 and 58, the lateral walls which seal against an edge of the rectangular GDL 40. The outlet 145 is fluidly connected to the outlet plenum 188, which is a fluidly connected region that spans from outlet end wall gallery 208 to two angled lateral wall galleries 210B and 210A. The lateral wall galleries are sealed via an extended gasket region 295 which is generally extended portion of the first and second lateral walls 56 and 58, the lateral walls which seals against an edge of the rectangular GDL 40.

The ratios of the inlet and/or outlet galleries formed between the sealing gasket and the annular wall of the rectangular GDL as shown in the exemplary figures, are not intended to be limiting.

The end wall inlet gallery (204) to rectangular GDL end wall (254) ratio is between about 1:1-about 1:5, about 1:1-about 1:4.5, about 1:1-about 1:4, about 1:1-about 1:3.5, about 1:1-about 1:3, about 1:1-about 1:2.5, about 1:1-about 1:2, about 1:1-about 1:1.5, and about 1:1-about 1:0. The end wall outlet gallery (206) to rectangular GDL end wall (254) ratio is between about 1:1-about 1:5, about 1:1-about 1:4.5, about 1:1-about 1:4, about 1:1-about 1:3.5, about 1:1-about 1:3, about 1:1-about 1:2.5, about 1:1-about 1:2, about 1:1-about 1:1.5, and about 1:1-about 1:0. The lateral wall inlet gallery (206) to rectangular GDL side wall (256) is between about 1:1-about 1:5, about 1:1-about 1:4.5, about 1:1-about 1:4, about 1:1-about 1:3.5, about 1:1-about 1:3, about 1:1-about 1:2.5, about 1:1-about 1:2, about 1:1-about 1:1.5, and about 1:1-about 1:0. The lateral outlet wall gallery (210) to rectangular GDL side wall (256) ratio is between about 1:1-about 1:5, about 1:1-about 1:4.5, about 1:1-about 1:4, about 1:1-about 1:3.5, about 1:1-about 1:3, about 1:1-about 1:2.5, about 1:1-about 1:2, about 1:1-about 1:1.5, and about 1:1-about 1:0.

It will be appreciated that the above illustrative aspects are exemplary and are not limiting to each other.

While the disclosure has been described in connection with the various aspects of the various figures, it will be appreciated by those skilled in the art that changes could be made to the aspects described above without departing from the broad inventive concept thereof. It is understood, therefore, that this disclosure is not limited to the aspects disclosed, and it is intended to cover modifications within the spirit and scope of the present disclosure as defined by the claims.

Features of the disclosure that are described above in the context of separate aspects may be provided in combination in a single aspect. Conversely, various features of the disclosure that are described in the context of a single aspect may also be provided separately or in any sub-combination. Finally, while an aspect may be described as part of a series of steps or part of a more general structure, each said step may also be considered an independent aspect in itself, combinable with others.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

What is claimed is:

1. A membrane electrode assembly (MEA) having efficient fluid distribution comprising:
- an ion transfer membrane (20); one of an anode (22) and cathode (24);
- a gas diffusion assembly comprising;
- a sealing gasket (50/50') forming a fluid containment space having a volume "V";
- a first interface (70);
- at least one inlet (140) through the gasket fluidly communicating with the fluid containment space;
- at least one outlet (145) through the gasket fluidly communicating with the fluid containment space;
- a generally planar rectangular porous gas diffusion layer (GDL) (40) with two end walls, and two side walls, configured to fit within the fluid containment space; whereby the first interface is sealable against the ion transfer membrane;
- at least one inlet plenum (186) formed around at least one edge of the GDL and an annular wall of the fluid containment space; and,
- at least one outlet plenum (188) formed around at least one edge of the gas diffusion insert GDL and an annular wall of the fluid containment space;
- wherein an inlet catch (221) and an outlet catch (223) formed from the sealing gasket extend laterally into the volume are provided at diagonally opposing corners of the gasket from each other, to position the GDL; and wherein each catch has two step walls positioned at 90 degrees to each other in plane with the GDL, each catch displaces a portion of the volume V; and each the lateral wall of the gasket catch partially seals against the lateral wall (LW) of the GDL without crushing.

2. The membrane electrode assembly (MEA) of claim 1, wherein the inlet plenum (186) is between an end (254) of GDL and the inlet end (52) of the gasket.

3. The membrane electrode assembly (MEA) of claim 1, wherein the outlet plenum (188) is between an end (254) of GDL and the outlet end (54) of the gasket.

4. The membrane electrode assembly (MEA) of claim 1, wherein an inlet end wall gallery (204) and a lateral inlet wall gallery (206) are fluidly connected forming the inlet plenum (186).

5. The membrane electrode assembly (MEA) of claim 1, wherein an outlet end wall gallery (208) and a lateral outlet wall gallery (210) are fluidly connected forming the outlet plenum (188).

* * * * *